Patented May 1, 1945

2,374,932

UNITED STATES PATENT OFFICE 2,374,932

DEHYDROGENATION OF HYDROCARBONS

Walter R. F. Guyer, Elizabeth, N. J., assignor to Standard Oil Development Company, a corporation of Delaware No Drawing. Application November 15, 1941, Serial No. 419,285

11 Claims. (Cl. 260—680)

This invention relates to the catalytic dehydrogenation of hydrocarbons of low molecular weight, for example those having from 2 to 5 carbon atoms, and is more particularly concerned with improved methods of operation and improved catalysts for use therein.

Typical of processes for the catalytic dehydrogenation of low molecular weight hydrocarbons are processes for converting butane to butene and processes for converting butene to butadiene. Both butene and butadiene are raw materials for the preparation of other products. For example, butene is an essential raw material in alkylation processes for the production of isooctane or other high octane number hydrocarbons for use in or as motor fuels; isobutene is an essential raw material for the preparation of isobutylene polymers of various molecular weights; and butadiene is an essential raw material for the production of synthetic rubbers such as Buna-N and Buna-S.

In the production of olefins and diolefins by the catalytic dehydrogenation of paraffins and olefins respectively, it is of course desirable to obtain as high a yield of the olefin or diolefin as possible on one passage of the initial material through the dehydrogenation zone and to obtain as small an amount as possible of by-products. It is also desirable to conduct the dehydrogenation under such conditions and in the presence of such catalysts that the formation of coke on the catalyst is reduced to a minimum. The efficiency of the catalyst is best measured in terms of percent selectivity by which is meant the percent of the total amount of initial material undergoing conversion which is converted to the desired dehydrogenated product. For example, if 50% of the initial material undergoes conversion in the reaction zone and 30% of the initial material consists of the desired dehydrogenated product, then the percent selectivity would be 60.

I have found a new type of catalyst which when used under certain conditions in the catalytic dehydrogenation of low molecular weight hydrocarbons makes it possible to obtain substantially greater yields of the desired dehydrogenated product than can be obtained by the use of previously known catalysts. The nature of the new catalysts and the conditions under which they are used will be fully understood from the following description:

For purposes of description it will be assumed that it is desired to prepare butadiene by the catalytic dehydrogenation of butene. The catalyst to be used comprises a major proportion of aluminum oxide, a minor proportion of vanadium oxide and a small amount of silver. The presence of small amounts of sodium or potassium oxide is also beneficial in some cases. The catalyst may consist, for example, of 77 to 93% by weight of aluminum oxide, 5–15% by weight of vanadium oxide and 2–8% by weight of silver. An especially effective catalyst of this type has the following approximate composition:

| Component | Percent by weight |
|---|---|
| $Al_2O_3$ | 85 |
| $V_2O_5$ | 10 |
| Ag | 5 |

One method of preparing a catalyst having the composition just given is as follows:

1860 grams of gelatinous aluminum hydroxide is rolled in a ball mill for about six hours together with 20 grams of vanadium oxide, 10 grams of silver oxide and 150 cc. of ammonium hydroxide. The silver oxide is prepared by adding 10% sodium hydroxide solution to 15.8 grams of silver nitrate. The thoroughly mixed ingredients are then dried and heated to a temperature of 1200° F. The catalyst so prepared may be molded or shaped into pills, tablets or pieces of any desired shape and size or it may be reduced to a fine powder. The form in which the catalyst is prepared will of course depend upon whether it is to be used in fixed or stationary form or in finely divided form suspended in the vapors of the hydrocarbons to be dehydrogenated.

Assuming the catalyst is to be used in stationary form, a suitable reaction chamber is filled with pills or pellets of the catalyst. Butene, mixed with a diluent such as steam, nitrogen, methane, flue gas and the like is then passed through the reaction chamber at a rate between 100 and 5000, preferably between 300 and 2000 volumes (measured at normal temperature and pressure) of butene per volume of catalyst per hour. The partial pressure of butene in the reaction chamber is preferably maintained between 80 and 200 mm. of mercury. This partial pressure may be obtained by dilution of the butene with the type of diluents mentioned above, by maintaining the reaction chamber under vacuum, or by a combination of both means.

The reaction chamber is maintained at a temperature between 1000 and 1600° F., preferably between 1100 and 1300° F., and under atmospheric pressure or under vacuum. The butene which passes through the reaction chamber unaffected may of course be recycled thereto together with additional diluent.

It will be found that after a period of 3 to 20 hours or more, the formation or deposition of coke on the catalyst will have reduced its activity to such an extent that a regeneration treatment is necessary or desirable. Regeneration of the catalyst may be effected by shutting off the flow of butene and diluent and passing steam or a mixture of inert gases containing small amounts of air or oxygen through the catalyst mass whereby the coke is removed by interaction with steam or by combustion respectively. Following removal of the coke, the flow of butene and diluent may be resumed. The temperature of the catalyst mass during regeneration should be maintained between about 1000 and 1200° F.

The following example illustrates the application of the process to the production of butadiene from butene:

Butene, at a reduced pressure of about 97 mm. of mercury, is passed through a reaction chamber maintained at a temperature of 1191° F. and containing a catalyst consisting of 85% by weight of aluminum oxide, 10% by weight of vanadium oxide and 5% by weight of silver at a rate of about 482 volumes of butene (measured at normal temperature and pressure) per volume of catalyst per hour for a period of 3 hours. The following results are obtained:

| | |
|---|---|
| Total butene converted____mol per cent__ | 50.1 |
| Butadiene _____do____ | 35.0 |
| Coke _____do____ | 8.9 |
| CO _____do____ | 0.71 |
| Per cent selectivity_____ | 70.0 |

It will be seen that 35 mol per cent of the butene is converted to butadiene with a percent selectivity of 70.

While the process has been described with particular reference to the production of butadiene from butene when using a fixed catalyst, it will be understood that it is equally applicable to the dehydrogenation of other low molecular weight paraffins or olefins and that the catalyst may be used in finely divided form.

This invention is not limited by any theories of the mechanism of the reactions nor by any details which have been given merely for purposes of illustration but is limited only in and by the following claims in which it is intended to claim all novelty inherent in the invention.

I claim:

1. An improved process for the catalytic dehydrogenation of low molecular weight hydrocarbons which comprises passing said hydrocarbons at a temperature between 1000 and 1600° F. over a catalyst comprising a major proportion of aluminum oxide, a minor proportion of vanadium oxide and a small amount of silver.

2. An improved process for the catalytic dehydrogenation of hydrocarbons having from 2 to 5 carbon atoms which comprises passing said hydrocarbons under a partial pressure of between 80 and 200 mm. of mercury and at a temperature between 1000 and 1600° F. over a catalyst comprising between 77 and 93% by weight of aluminum oxide, 5 and 15% by weight of vanadium oxide and 2 and 8% by weight of silver.

3. An improved process for the catalytic dehydrogenation of low molecular weight hydrocarbons which comprises diluting said hydrocarbons with an inert gas to reduce the partial pressure of said hydrocarbons in the mixture to between 80 and 200 mm. of mercury and passing the mixture at a temperature between 1000 and 1600° F. over a catalyst consisting of a major proportion of aluminum oxide, a minor proportion of vanadium oxide and a small amount of silver.

4. An improved process for the catalytic dehydrogenation of low molecular weight hydrocarbons which comprises passing said hydrocarbons at a pressure between 80 and 200 mm. of mercury and at a temperature between 1000 and 1600° F. over a catalyst consisting of a major proportion of aluminum oxide, a minor proportion of vanadium oxide and a small amount of silver.

5. An improved process for the dehydrogenation of a hydrocarbon having 4 carbon atoms which comprises passing said hydrocarbon under a partial pressure between 80 and 200 mm. of mercury and at a temperature between 1000 and 1600° F. over a catalyst consisting of a major proportion of aluminum oxide, a minor proportion of vanadium oxide and a small amount of silver.

6. Process according to claim 5 in which the hydrocarbon is passed over the catalyst at a temperature between 1100 and 1300° F.

7. Process according to claim 5 in which the partial pressure of the hydrocarbon is reduced to between 80 and 200 mm. of mercury by diluting it with steam.

8. Process according to claim 5 in which the catalyst consists of between 77 and 93% by weight of aluminum oxide, between 5 and 15% by weight of vanadium oxide, and between 2 and 8% by weight of silver.

9. Process according to claim 5 in which the hydrocarbon of 4 carbon atoms is butene.

10. Process according to claim 5 in which the catalyst comprises 85% by weight of aluminum oxide, 10% by weight of vanadium oxide and 5% by weight of silver.

11. Process for converting butene to butadiene which comprises passing the butene under a partial pressure between 80 and 200 mm. of mercury and at a temperature between 1100 and 1300° F. over a catalyst consisting of a major proportion of aluminum oxide, a minor proportion of vanadium oxide and a small amount of silver.

WALTER R. F. GUYER.